Figure 1:
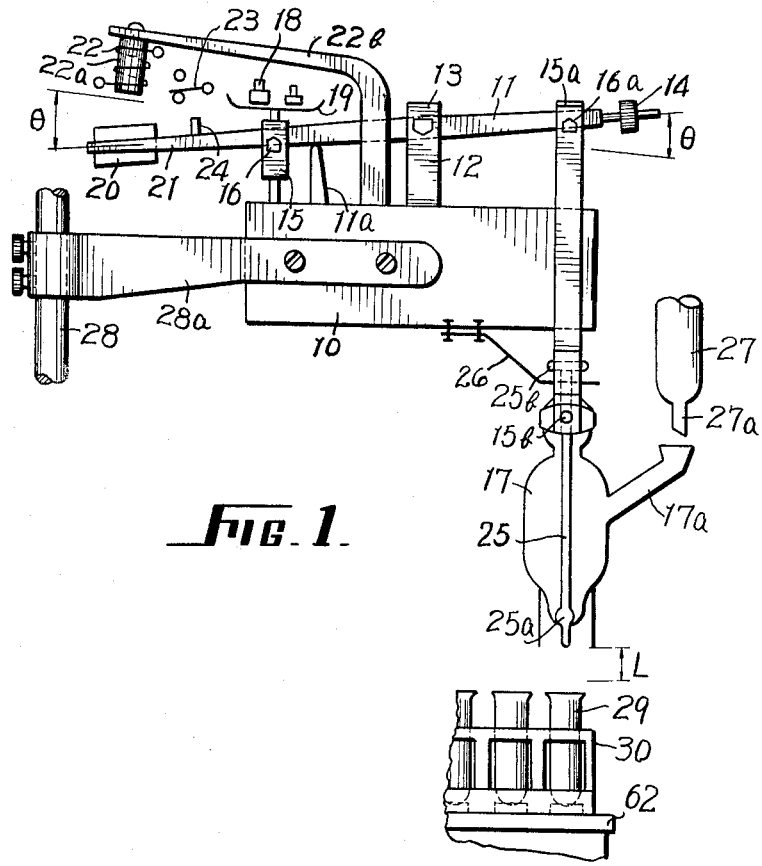

Feb. 22, 1966 MASAYUKI KATAGIRI ET AL 3,236,321
FRACTION COLLECTOR
Filed Dec. 2, 1963 4 Sheets-Sheet 1

INVENTORS
MASAYUKI KATAGIRI
BY MICHIHIKO KISHITA

INVENTORS
MASAYUKI KATAGIRI
BY MICHIHIKO KISHITA

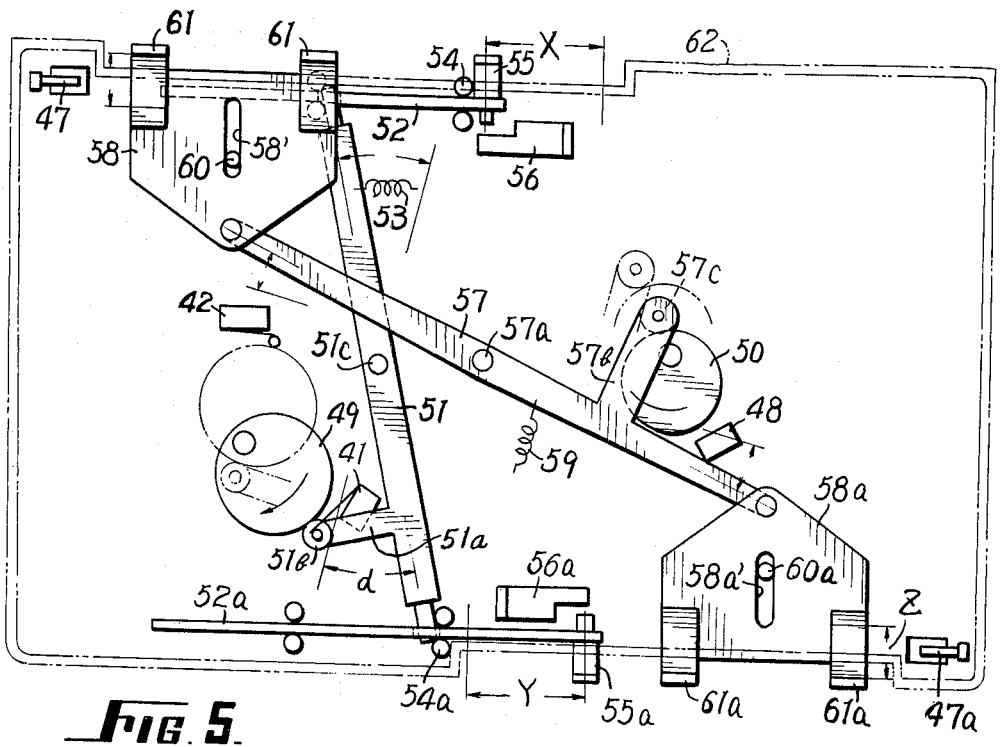

United States Patent Office
3,236,321
Patented Feb. 22, 1966

3,236,321
FRACTION COLLECTOR
Masayuki Katagiri, Kanazawa, Ishikawa, and Michihiko Kishita, Chikusa-ku, Nagoya-shi, Japan, assignors to Kabushikikaisha Toyo Seisakusho, Osaka, Japan
Filed Dec. 2, 1963, Ser. No. 327,432
Claims priority, application Japan, June 19, 1963,
38/32,192
7 Claims. (Cl. 177—114)

This invention relates to fraction collectors operable to meter and release successive substantially equal liquid fractions from a continuous liquid supply and to distribute the released fractions step-by-step and in succession to a series of respective collectors.

Various fraction collectors of this type have been devised, and some are now in common commercial use, especially in the chemical industry. One conventional fraction collector operates on the counter principle, in which the number of droplets of liquid supplied to the liquid collector is counted. As will be apparent, an arrangement of this type can operate only at a slow speed, so that a desired high efficiency cannot be attained.

Other fraction collectors operate on the volume determination principle, in which the volume of each liquid fraction taken from a continuous supply is accurately measured, with each measured fraction being fed to a respective collector. Still other fraction collectors operate on a weighing principle, utilizing, for this purpose, balance beams.

A common disadvantage of conventional fraction collectors is the employment of electronic elements, relays, and other highly complicated and delicate components. Since fraction collectors are utilized most frequently in chemical laboratories, these delicate components are subjected to the action of corrosive atmospheres, moisture conditions, and to other environmental conditions of like nature. It will be appreciated that these delicate components function effectively in a stabilized range only when they operate in a substantially inert atmosphere having a constant temperature as well as a constant moisture content. Such fraction collectors furthermore are preferably supported by vibration-proof constructions in order to insure highly accurate fractioning operations.

Known fraction collectors treat the liquid to be fractioned directly on the collector, and this frequently leads to unavoidable failure of the aforementioned delicate components. In order to avoid this latter disadvantage, frequent cleaning operations must be performed. However, the highly complicated design of conventional fraction collectors generally prevents, or at least hinders, adequate cleaning operations. Thus, with conventional fraction collectors, precise and stabilized operation over long periods of time is very difficult to attain.

For the stepwise transportation of the collectors to the fractionating apparatus, conventional fraction collectors have generally relied upon the merry-go-round principle in which a circular rotatable table is used and supports a number of collectors or receivers arranged thereon in one or more circles, in a spiral, or in like manner. Other machines have utilized conveyor belts or chains to transport the collectors or receivers. In view of their construction, such conventional fraction collectors musts employ highly complicated mechanical feeding means, which are subject to frequent and serious operational troubles which cannot be remedied without the expenditure of considerable labor and time.

Another disadvantage of known fraction collectors is that they are not constructed to operate within a limited or confined area, such as in a constant temperature space equipped, for example, with refrigeration means. Furthermore, known fraction collectors are not equipped to operate in parallel with each other.

In view of the foregoing, the principal object of the present invention is to provide a novel fraction collector in which, by means of novel constructional features, the above-mentioned disadvantages inherent in conventional fraction collectors are obviated.

For an understanding of the principles of the invention, reference is made to the following description of a typical embodiment thereof as illustrated in the accompanying drawings.

Figure 4:
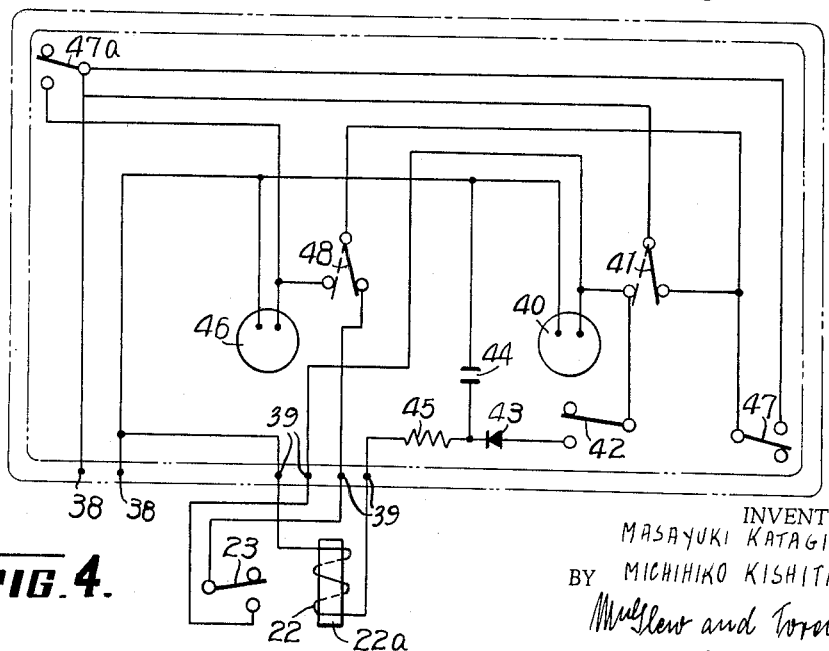
Figure 6A:
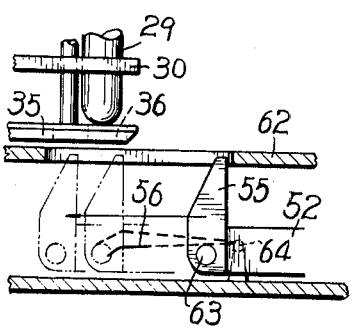
Figure 6B:
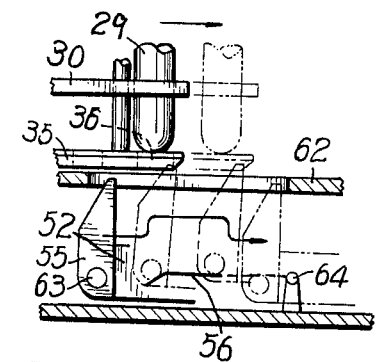

In the drawings:
FIG. 1 is a somewhat schematic partial side elevation view of the balance beam metering and fractioning section of a fraction collector embodying the invention;
FIGS. 2a–2d are somewhat schematic top plan views illustrating the movement of groups of fraction collectors along a rectangular circuit during successive liquid fractioning and transport operations;
FIGS. 3a–3d are, respectively, a top plan view, an elevation view, a transverse sectional view, and a bottom plan view of a carrier for the fraction collectors or tubes;
FIG. 4 is a schematic wiring diagram of the control components of the invention fraction collector;
FIG. 5 is a somewhat schematic side elevation view of a dual collector feed mechanism usable in the fraction collector embodying the invention;
FIGS. 6a and 6b are somewhat schematic detail vertical sectional views of a lifter cam arrangement used in the fraction collector, and showing two successive positions of the parts;
FIGS. 7a and 7b are somewhat schematic vertical sectional views of a jam preventing mechanism, showing two different positions of the parts; and
FIGS. 8a and 8b are schematic plan views corresponding to FIGS. 7a and 7b, respectively.

Referring first to FIG. 1, the weighing and fractioning section of a fraction collector, embodying the invention, is illustrated as including a stationary block or support 10 from which a balance column 12 extends upwardly. By means of a knife edge 13, a balance beam 11 is pivotally supported on column 12. In a conventional manner, an adjustable weight 14 is threaded along one end of beam 11 to provide for accurate balancing of the latter. Between knife edge 13 and the other end of beam 11, a suspension member 15 is supported on beam 11 by means of a knife edge 16, and has fixed thereto a conventional scale pan 19 for mounting standard weights 18.

Adjacent adjustable weight 14, a suspension bar 15a is supported on beam 11 by means of a knife edge 16a. The lower end of bar 15a is connected, by means of a slidable type lost motion coupling 15b, with an elongated valve member 25 slidable in a fractioning bottle or container 17 swingably suspended on bar 15a.

A permanent magnet 20 is fixedly mounted on the lefthand end of an extension 21 of beam 11, as viewed in FIG. 1, and an electromagnet, comprising an energizing coil 22 and a core 22a, is mounted on the free end of an L-shaped arm 22b having its lower end fixedly supported on block 10. The energizing circuit of coil 22 will be described in connection with FIG. 4, but has been omitted from FIG. 1 for the sake of simplifying the illustration. However, it should be noted that a control switch 23 schematically illustrated in FIG. 1 is closed when an actuating abutment 24 on extension beam 21 engages the switch upon clockwise swinging of beam 11 from the normal rest position shown in FIG. 1.

The lower end of valve 25 is formed as a valve plug 25a which is precisely ground to have a sealing fit in an opening through the bottom of container 17. An offset fork member 26 is fixed at one end to the bottom of block 10, and its forked free end slidably and loosely engages the upper end portion of valve member 25 below an enlarged head 25b thereon, the member 26 thus serving as a guide for valve member 25. A hollow or tubular column 27 is rigidly supported in a suitable manner, and is arranged to supply a continuous liquid flow, to be metered and delivered to the collectors or receivers, from its lowermost end opening 27a to the upper end of an inlet 17a of container 17. Column 27 is actually supported upon a supporting arm 28 which is adjustably supported in a supporting arm 28a secured to block 10, although, for convenience, FIG. 1 illustrates rod 28 and column 27 at opposite ends of the structure and the supporting means for column 27 are not illustrated.

In the normal position, balance beam 11 engages a stop 11a fixed on the upper surface of block 10, but beam 11 may swing in a vertical plane through a predetermined angle $\theta$ as illustrated. Correspondingly, container 17, valve member 25 and suspension bar 15a may reciprocate vertically, in unison, as indicated by the double ended arrow L in FIG. 1.

In advance of operation of the device, beam 11 is balanced by adjusting weight 14, with container 17 remaining empty. Following this, weights equal to the desired weight of the liquid fractions, are placed on scale pan 19. This causes balance beam 11 to swing counterclockwise to engage stop 11a. As both containers 17 and valve member 25 are lifted conjointly by such swinging of balance beam 11, valve 25a remains, by its own gravity, in sealing relation with the bottom opening of container 17.

Liquid is now supplied continuously from column 27 through opening 27a and inlet 17a to container 17, where it will accumulate gradually. When the weight of the accumulated liquid equals the weights 18 on scale 19, beam 11 will swing clockwise until it occupies a horizontal balanced position. In this balanced position, the core 22a is within the magnetic field of permanent magnet 20, so that members 20 and 22a are rapidly attracted into engagement with each other. These two members remain in engagement since, at this time, winding 22 associated with core 22a is not energized.

As beam 11 thus moves clockwise, container 17 and valve member 25, suspended on bar 15a, are lowered a certain distance. However, during such downward movement of container 17 and valve member 25, head 25b of valve member 25 engages fork 26, limiting downward movement of valve member 25. In effect, valve member 25 moves upwardly relative to container 17. Valve 25a is thus moved out of sealing relation with the opening in the bottom of container 17. The liquid then accumulated in container 17 flows through the bottom opening thereof into one of the collector or receiver tubes 29 mounted on a carrier 30 slidable on a base frame 62 disposed beneath the weighing and fractionating section of the apparatus.

Due to the clockwise movement of balance beam 11, abutment 24 engages switch 23 which is connected in a control circuit for carrier 30, described more fully hereinafter. Also, upon completion of discharge of the accumulated liquid into a collector 29, a time delay means is made effective as will be described more fully hereinafter and, after a predetermined time interval, a direct current is supplied through winding 22 to magnetize core 22a. The direction of current flow through winding 22 is selected so that the adjoining pole faces of permanent magnet 20 and core 22a are at the same polarity. Thus, energization of coil 22 results in a strong repulsive force between the electromagnet and the permanent magnet, and this rotates balance beam 11 in a counterclockwise direction to open switch 23 and to denergize electromagnetic winding 22. The balance beam thus returns to the starting position shown in FIG. 1.

The use of magnetic attraction and magnetic repulsion to control the discharge of liquid from container 17 into a collector 29 has outstanding operating advantages. In the first place, the time interval required for opening and closing container 17 is outstandingly shorter than that obtainable with conventional apparatus, so that the necessary periodic liquid delivery can accurately follow the liquid fractioning operation. Secondly, as the return or clockwise movement of balance beam 11, which results in the reclosing of the valve means, is effected at the highest possible speed, a separated liquid fraction cannot be mixed, for all practical purposes, with any part of the liquid still being continuously supplied to container 17 for the next fractioning operation. A third advantage is that the pivotal movement of balance beam 11 per se is utilized directly for accurate control of the valve beams, thus simplifying the construction. A fourth advantage is that, since the electromagnet is energized only during the repulsing stroke, possible variations in the operation of the magnetic assembly caused by heating, for example, are substantially obviated so that a practically constant operation of the weighing and fractioning mechanism is assured. Finally, the quick repulse movement obtained by the magnet assembly results in a slight shock being imparted to the fractioning container 17, as well as to the valve means 25, so that small quantities of liquid adhering to these elements at the termination of the fractioning period are effectively separated therefrom and fed to a collector 29.

The magnetic attraction and repulsion mechanism mentioned is shown only by way of example. If a more complicated mechanism can be used practically, photoelectric means may be substituted for the magnet means and the various positions of balance beam 11 may be sensed by photoelectric means with the resulting output signal used to control the operation of carriage 30. A conventional approach sensing switch may be used for the same purpose. Alternatively, permanent magnet 20 may be replaced by a paramagnetic metal member which is not magnetized, and the supply of current to electromagnet winding 22 may be reversed relative to the operating period, whereby the same effect may be obtained. Another alternative is to arrange an additional electromagnet below permanent magnet 20 to attract and repulse the latter. However, experience has indicated that the mechanism shown and described is effective to obtain accurate and quick weighing and fractioning, so that alternative means are not necessary. Switch 23 is preferably a microswitch, which requires only a very slight force for operation and thus imposes no hindrance to the pivoting of balance beam 11.

FIGS. 2a through 2d illustrate how the successive collectors or receivers 29 are brought into position beneath the bottom opening of container 17. The collectors or receivers, which may take the form of test tubes, are arranged in groups of ten, with each group being supported in a rectilinear row on a slidable carriage or slide 30. In the particular embodiment illustrated, there are two columns of such slides 30 arranged on base frame 62 in parallel relation, with each column being offset relative to the other by the width of one slide 30.

Figure 2A:
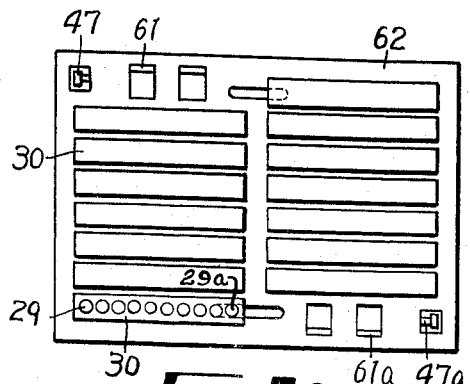
Figure 2B:
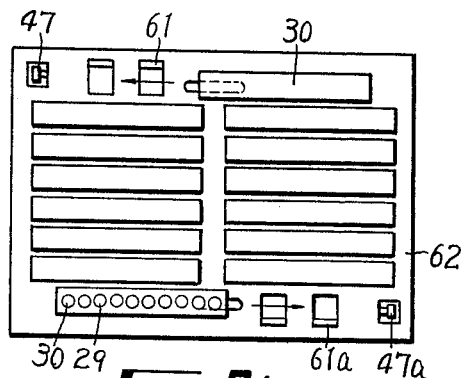

Each receiver 29 has its fraction delivered thereto when it is in the position 29a, of FIG. 2a, in other words in the position of the tube at the right end of the slide 30 in the lowermost position in the left column. Upon completion of a fractioning operation, the lowermost slide 30 in the lefthand column and the uppermost slide 30 in the righthand column are simultaneously stepped to the right and to the left, respectively, by the center distance between two test tubes 29, as indicated by the arrow in FIG. 2b. This brings the next successive receiver 29 beneath the container 17. When all ten receivers 29 on the lowermost slide 30 of the lefthand column have received their fractions, the slides occupy the position shown in FIG. 2c.

At this time, the lefthand column of slides 30 is moved downwardly and the righthand column of slides 30 is moved upwardly. These movements are effected simultaneously through a distance equal to the width of a slide 30. The parts now occupy the position shown in FIG. 2d, and the stepping operation is continued, responsive to each fractioning operation, until all 140 test tubes 29 arranged in slides 30 on support frame 62 have been filled.

By way of example, each of the test tubes 29 may have a 17 mm. diameter and, in such case, the mounting base 62 will be 23 inches x 12 inches. The area required for base 62 is one quarter or less the area required for an equivalent capacity turntable.

Figure 3A:
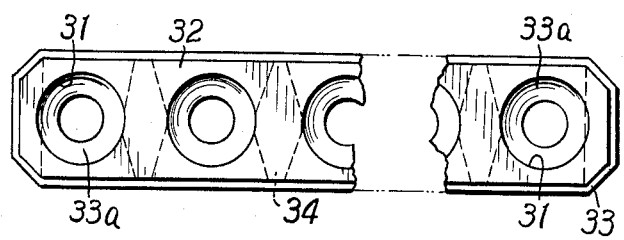
Figure 3C:
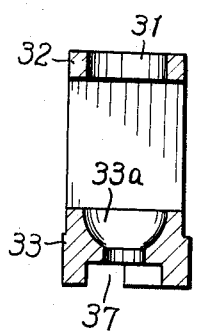
Figure 3B:
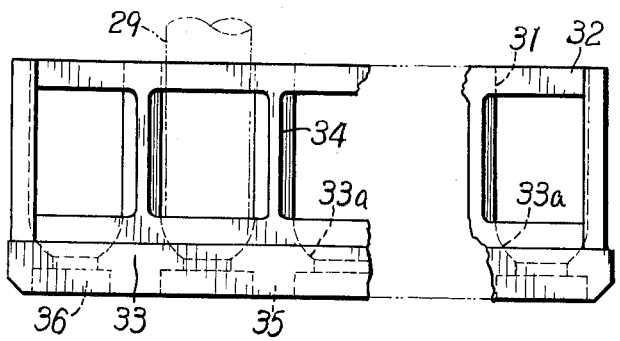

Referring to FIGS. 3a through 3d, each slide 30 has an upper wall 32 with a series of spaced apertures 31 therethrough, each aperture having a diameter corresponding to, or slightly larger than, the diameter of a test tube 29, as best seen in FIG. 3b. Each slide 30 further has a relatively elongated lower wall 33 formed with a series of spaced substantially concave recesses 33a in its upper surface each vertically aligned with an aperture 31. Partitions 34 interconnect upper wall 32 and lower wall 33, and the slide may be molded as a single piece.

Figure 3D:
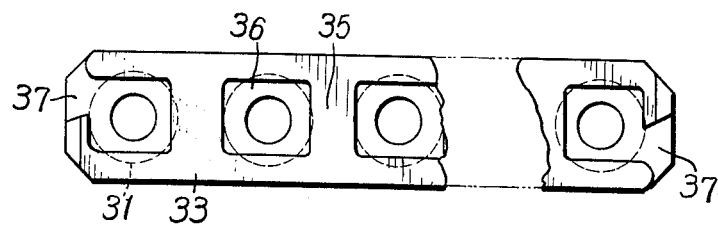

The bottom surface of lower wall 33 is formed with a series of space rectangular recesses 36, each aligned with a concave recess 33a, the recesses 36 being separated by transverse webs or partitions 35. As will be described hereinafter, recesses 36 cooperate with feed pawls. Passages 37 communicate with each of the end recesses 36, as best seen in FIG. 3d, the two passages 37 being offset laterally relative to each other. These passages serve for idling of the slide 30 under certain circumstances, and prevent jamming of the slide moving mechanism.

The stepping movement of slides 30 along base frame 62 is effected by the means shown in FIGS. 4–8b, with FIG. 4 being a schematic wiring diagram of the control circuit and FIG. 5 being a general view of the mechanism controlled by the circuitry of FIG. 4.

Referring first to FIG. 4, a pair of input terminals are connected to a suitable source of electric potential, such as an A.C. source of a commercial frequency. The circuit shown in FIG. 4 includes the electromagnet winding 22 and the switch 23 shown in FIG. 1. These are connected to respective ones of four terminals 39. A motor 40 is provided to effect longitudinal stepping of slides 30 and has a hold switch 41 associated therewith. A time limit switch 42 is operable by motor 40 after the latter has rotated through a predetermined angle following its initial energization, switch 40 controlling the time of the repulsion operation for beam 11. A rectifier 43, in association with filtering means comprising a condenser 44 and a resistance 45, is provided to feed a smoothed rectified D.C. current to electromagnet winding 22. A second motor 46 is provided for displacing the two columns of slides 30 conjointly. Each motor, 40 and 46, has a cam associated therewith and driven at a reduced speed, these cams controlling the stepping motion of the slides 30 and of the columns of slides.

The circuitry shown in FIG. 4 is set into operation when control switch 23 is transferred by clockwise turning movement of beam 11, as previously described. Transfer of switch 23 closes the energizing circuit for motor 40, and motor 40 transfers its holding switch 41 to the dotted line position of FIG. 4. Motor 40 will thus continue to operate even after control switch 23 is re-opened. During this period, delivery of the liquid fraction from container 17 to collector 29 is completed. When motor 40 has turned through a predetermined angle, the cam operated thereby closes switch 42 whereby direct current is supplied to winding 22, resulting in the magnetic repulsion effect on beam 11 swinging the latter counterclockwise. This will re-open switch 23.

When the cam operated by motor 40 has returned to its initial position, the holding circuit for motor 40 is broken by moving switch 41 to the solid line position. During this period, the slide 30 carrying the collectors 29 then positioned in operative relation to container 17 is shifted longitudinally one step. Since switch 42 has already been opened by operation of motor 40, energization of electromagnet winding 22 is interrupted and balance beam 11 is in the position for the succeeding fractioning operation. This operation is repeated ten times and until all ten collectors 29 on a particular slide 30 have been filled.

Figure 2C:
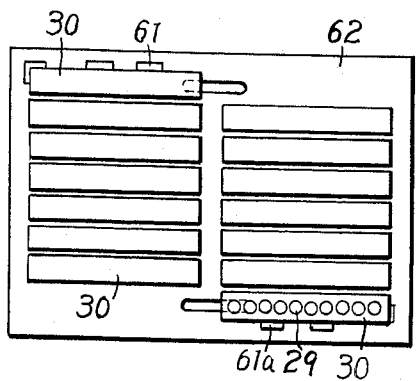
Figure 2D:
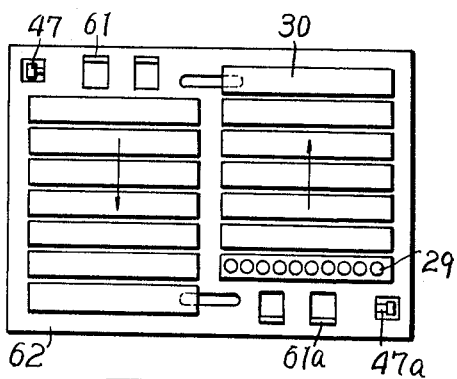

As previously stated, as a carriage 30 in the lefthand column of FIG. 2a is shifted to the position of FIG. 2a, a carriage 30 in the righthand column of FIG. 2a is shifted to the lefthand position shown in FIG. 2c. This results in closing of control switches 47 and 47a, which preferably are mounted on base frame 62 as shown in FIG. 5. Closure of switches 47 and 47a completes an energizing circuit for motor 46 and, as motor 46 starts to rotate, it closes a holding switch 48 so that the motor energizing circuit will remain completed even though switches 47 and 47a are re-opened. Operation of motor 46 continues until the cam 50 (FIG. 5) operated thereby has completed one revolution, at which time switch 48 is re-opened. During this one revolution of cam 50, the two columns of slides are shifted from the positions shown in FIG. 2c to the positions shown in FIG. 2d.

It should be noted that motor 46 is energized only while motor 40 is de-energized. Thus, even if switches 47 or 47a should be accidently closed inadvertently, a column shift cannot take place.

If switch 41 is adjustably positioned relative to its control cam 49 (FIG. 5) operated by motor 40, or if it is replaced by two or more similar switches, the stopping position of motor 40 may be selectively adjustable. Thereby the time interval from energization of motor 40 to initiation of the carriage feed, more specifically the time interval between the opening and closing of the bottom outlet of the container 17, may be adjusted as required. Such adjustment may be effected taking into consideration the viscosity of the liquid, the size of the fraction, or like factors.

Referring to FIG. 5, cam 49 is rotated at a reduced speed by motor 40, and cam 50 is rotated at a reduced speed by motor 46. Cam 49 operates a feed or stepping lever 51 having a laterally projecting rigid arm 51a on the free end of which there is a cam follower roller 51b maintained in engagement with cam 49 by spring 53. As cam 49 rotates, lever 51 is caused to swing about its substantially central pivot 51c through a stroke indicated by the angle α.

Reduced extensions on the opposite ends of lever 51 are slidably engaged in correspondingly shaped slots formed in feed members 42 and 52a, slidably guided by two or more pairs of guide pins 54 and 54a, respectively, so as to perform a reciprocating rectilinear motion within a limited range indicated by the double-ended arrows X and Y, respectively. A feed pawl 55 is mounted on the right end of feed member 52 and a feed pawl 52a is mounted on the right end of feed member 52a, these pawls being arranged to displace the associated container carrying slides 30 longitudinally. Lift cams 56 and 56a are mounted on the base frame intermediate the limits of movements of pawls 55 and 55a, and each lift cam co-operates with a respective pawl as will be described more fully hereinafter.

In FIG. 5, switch 41 is illustrated as a microswitch positioned adjacent cam follower 51b, and switch 42 is illustrated as a microswitch operated by cam 49 after a predetermined angular rotation thereof. A column shifting lever 57 is pivotally mounted at a central pivot 57a on frame 62, and its opposite ends are hingedly connected with feed slides 58 and 58a, respectively. An arm 57b projects rigidly and laterally from lever 57 and its free end carries a cam follower roll 57c maintained in engagement with circular cam 50 by a tension spring 59. Thus, as cam 50 is rotated by motor 46, column feed slides 58 and 58a are reciprocated in unison in opposite rectilinear directions laterally relative to the path of movement of feed slides 52 and 52a, respectively. For this purpose, slides 58 and 58a are formed with elongated laterally extending slots 58' and 58a' in which are slidably engaged stationary pins 60 and 60a, respectively, fixedly mounted on frame 62. Each feed slide 58 and 58a is provided with a pair of spaced upwardly directed feed pawls 61, 61 or 61a, 61a, respectively.

When switch 23 is closed motor 40 rotates cam 49 in a clockwise direction as indicated by the arrow in FIG. 5. This causes lever 51 to swing clockwise under the influence of spring 53 so that feed members 52 and 52a move rearwardly in directions opposed to each other. At the end of this rearward stroke, switch 42 is closed by cam 49 to energize electromagnet winding 22 with the resultant operation of balance beam 11. Upon further rotation of cam 49, lever 51 is swung counterclockwise to return feed members 52 and 52a to their original position. During this return movement, the feed pawls are shifted by transfer means 56 and 56a, respectively.

Referring to FIGS. 6a and 6b, feed pawl 55 has a pin 63 fixedly extending therefrom. Transfer means 56 is illustrated as a plate which is pivoted at its narrow end to base frame 62 and has a downwardly curved free end. When feed member 52 moves rearwardly, as indicated by the arrow in FIG. 6a, pin 63 travels beneath transfer means 56. Upon forward movement of feed member 52, as indicated by the arrow in FIG. 6b, pin 63 rides up and over the free end of transfer means 56 for a distance equal to the center-to-center spacing of two adjacent collectors 29, after which pin 63 moves back into its lower position. In the elevated position of pin 63 and pawl 55, the latter is projected through an elongated slot in the upper panel of base frame 62 and thus engages in the corresponding recess 36 of a carriage 30 and abuts against a partition 35 so that the carriage 30 is stepped in the forward direction. The other transfer means 56a is identical with that just described.

As stated, the stepwise feed of two carriages 30 longitudinally is repeated ten times until all of the receivers on a carriage have been filled. When this has occurred, the upper carriage 30 in the left column and the lower carriage 30 in the right column occupy the position shown in FIG. 2c in which they have abutted and operated the switches 47 and 47a, respectively. This energizes feed motor 46 to rotate cam 50 clockwise as indicated by the arrow in FIG. 5. With the resultant swinging motion of feed lever 57, both columns of slides are shifted in opposite directions by means of the feed pawls 61 and 61a on the feed slides 58 and 58a, respectively. When such shifting has been accomplished, slides 58 and 58a are returned to their initial positions during the remaining portion of the swinging movement of lever 57. Although such has not been illustrated, the upper panel of base frame 62 is formed with elongated slots slidably receiving feed pawls 61 and 61a, and the feeding stroke of these pawls is selected so as to be equal to the width of each slide 30.

Should one of the longitudinally shifted slides 30 arrive at its terminal position before the other, the provision of passages 37, shown in FIG. 3d, provides for idling and prevents jamming. This feature is best illustrated in FIGS. 7a, 7b, 8a and 8b. FIGS. 7a and 8a schematically illustrate the regular or normal slide feeding condition, whereas FIGS. 7b and 8b illustrate an idling feed.

While a specific embodiment of the invention has been shown and described in detail to illustrate the application of the principles of the invention, it will be understood that the invention may be embodied otherwise without departing from such principles.

We claim:
1. In a fraction collector including a balance beam operable to weigh and release successive selective liquid fractions from a liquid supply relative to a fractioning container having a bottom outlet opening and valve means controlling said outlet opening and connected to said beam: the improvement comprising means suspending said container on one end of said beam; a permanent magnet mounted on the other end of said beam; a stationary electromagnet, having a paramagnetic core, fixedly mounted in the range of movement of said permanent magnet and normally deenergized; a normally open switch fixedly mounted adjacent said electromagnet and closed responsive to accumulation of a selected liquid fraction in said container, and reopened responsive to discharge of the selected liquid fraction from said container; said beam, responsive to accumulation of said selected liquid fraction in said container, swinging in a direction to open said valve means and advance said permanent magnet toward said electromagnet, whereby said permanent magnet is magnetically drawn into engagement with said core; said switch, when closed, energizing said electromagnet, after a pre-set time delay sufficient for discharge of said selected fraction from said container, with a polarity such as to repulse said permanent magnet; whereby to swing said beam in the opposite direction to reclose said valve means with re-opening of said switch.

2. In a fraction collector including a balance beam operable to weigh and release successive selective liquid fractions from a liquid supply relative to a fractioning container having a bottom outlet opening and a valve means controlling said outlet opening and connected to said beam; the improvement comprising means suspending said container on one end of said beam; a permanent magnet mounted on the other end of said beam; a stationary electromagnet, having a paramagnetic core, fixedly mounted in the range of movement of said permanent magnet and normally deenergized; a normally open switch fixedly mounted adjacent said electromagnet and closed responsive to accumulation of a selected liquid fraction in said container, and reopened responsive to discharge of the selected liquid fraction from said container; said beam, responsive to accumulation of said selected liquid fraction in said container, swinging in a direction to open said valve means and advance said permanent magnet toward said electromagnet, whereby said permanent magnet is magnetically drawn into engagement with said core; said switch, when closed, energizing said electromagnet, after a pre-set time delay sufficient for discharge of said selected fraction from said container, with a polarity such as to repulse said permanent magnet; whereby to swing said beam in the opposite direction to reclose said valve means with re-opening of said switch; a plurality of relatively elongated slidably supported carriages each mounting a plurality of receptacles in succession longitudinally thereof; means for displacing said carriages stepwise, in succession, laterally thereof, into longitudinal alignment with said container; means operable to advance each carriage, when longitudinally aligned with said container, stepwise to bring each receptacle thereon successively beneath said bottom outlet opening to receive such selected liquid fraction; and means operable, after all the receptacles on a carriage have received the selected liquid fractions from said container, to displace the carriage laterally of itself out of longitudinal alignment with said outlet opening.

3. In a fraction collector, the improvement defined in claim 2, in which said means for advancing each carriage longitudinally in alignment with said outlet opening comprises a feed motor, a cam driven by said feed motor, a pivotally mounted rocking lever operated by said cam, and a slide operated by said lever and engageable with the carriage then longitudinally aligned with said outlet opening; said motor having an energizing circuit controlled by said normally open switch; said cam operating said lever to reciprocate said slidable member to advance the carriage one step longitudinally, a predetermined time interval after energization of said motor.

4. In a fraction collector, the improvement defined in claim 1, in which said pre-set time delay is provided by a condenser-resistor combination connected in an energizing circuit between said switch and said electromagnet.

5. In a fraction collector, the improvement defined in claim 2, including means supporting said carriage for sliding movement in a common horizontal plane, said carriages being arranged in two separated parallel columns, each column extending laterally of the carriages therein; said means for displacing said carriages laterally of themselves comprising a second feed motor, a second cam driven by said second feed motor, a second lever pivoted intermediate its ends, and slides articulated to the opposite ends of said second lever; whereby, upon operation of said second cam the carriages in the two respective columns are displaced laterally of themselves in opposite directions; and an energizing circuit for said second motor including limit switch means operable by longitudinal movement of a carriage to a limiting position in which all of its receptacles have received a selected liquid fraction from said container.

6. In a fraction collector, the improvement defined in claim 3, including a feed pawl mounted on one end of said slidable member; and switch means operatively associated with said feed pawl and arranged to displace said feed pawl into engagement with a carriage during one direction of movement of said blocking lever and to displace said feed pawl out of engagement with a carriage during movement of said rocking lever in an opposite direction.

7. In a fraction collector, the improvement defined in claim 6, in which the undersurface of each carriage is formed with a series of recesses each operatively associated with a respective receptacle thereon, said recesses being successively engageable by said feed pawl; the end recesses of each carriage being formed with lateral openings for preventing jamming of said feed pawl in a carriage recess when the latter reaches its limit of movement in a selected direction.

References Cited by the Examiner
UNITED STATES PATENTS

| | | | |
|---|---|---|---|
| 2,451,891 | 10/1948 | Vagim | 177—108 |
| 2,650,791 | 9/1953 | Adams | 177—114 |
| 2,842,330 | 7/1958 | Hopkins | 177—108 |

FOREIGN PATENTS 123,887    1/1949    Sweden.

LEO SMILOW, *Primary Examiner.*

LEYLAND M. MARTIN, *Examiner.*